Sept. 15, 1931. R. L. DYAS ET AL 1,823,824
MACHINE TOOL FOR DRESSING ARTICLES ON NONPARALLEL SURFACES
Filed July 13, 1928 4 Sheets-Sheet 1
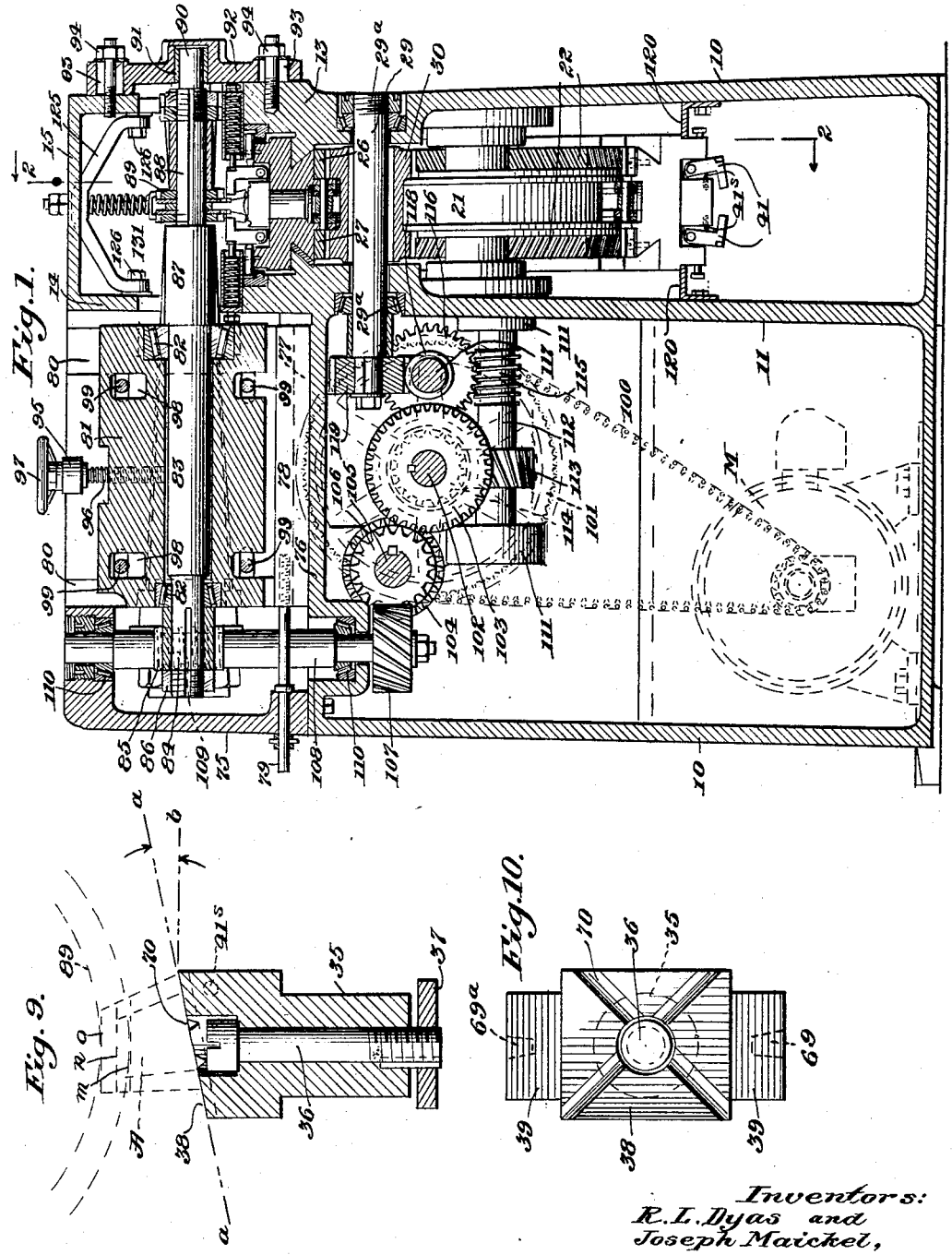
Inventors:
R. L. Dyas and
Joseph Maickel,

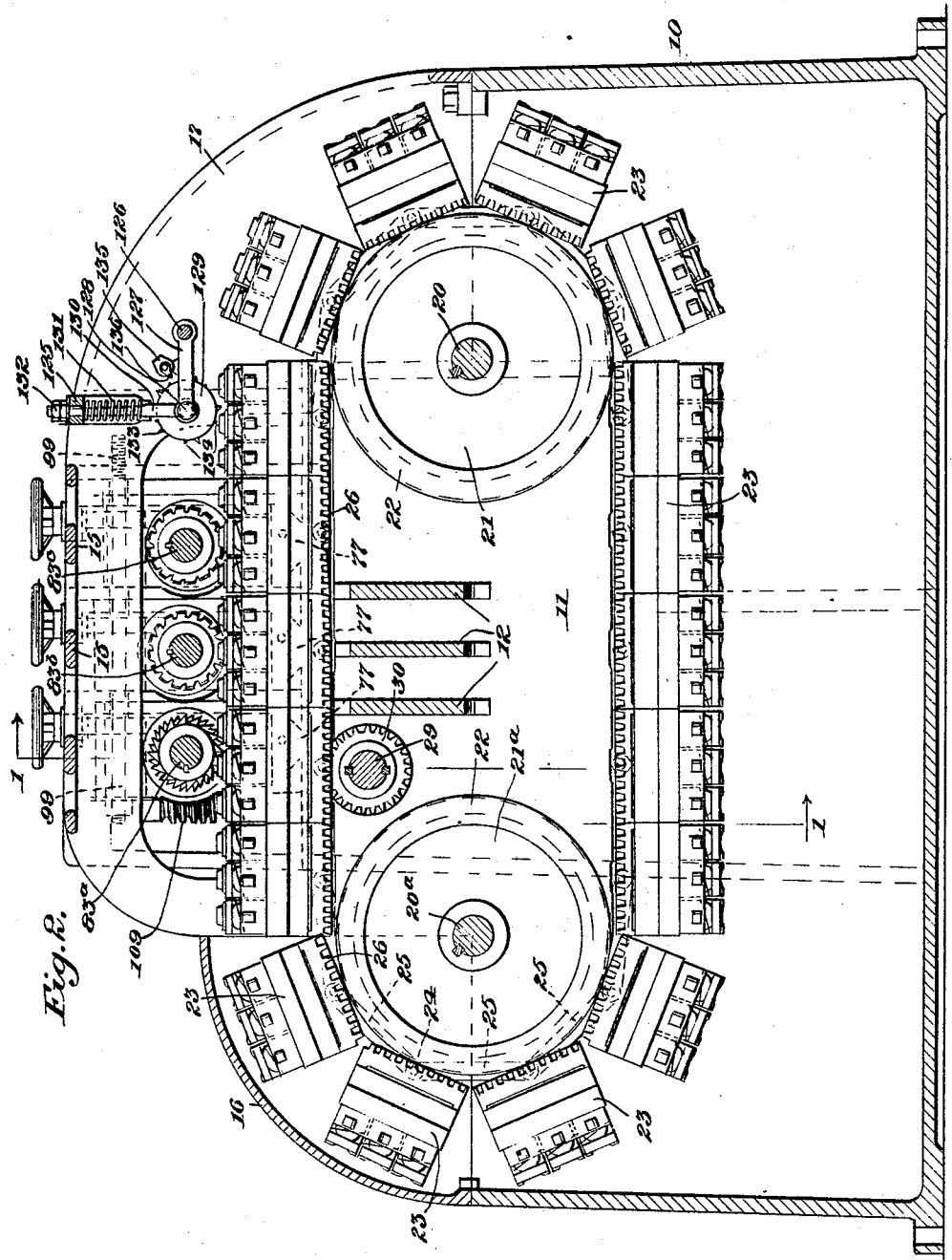

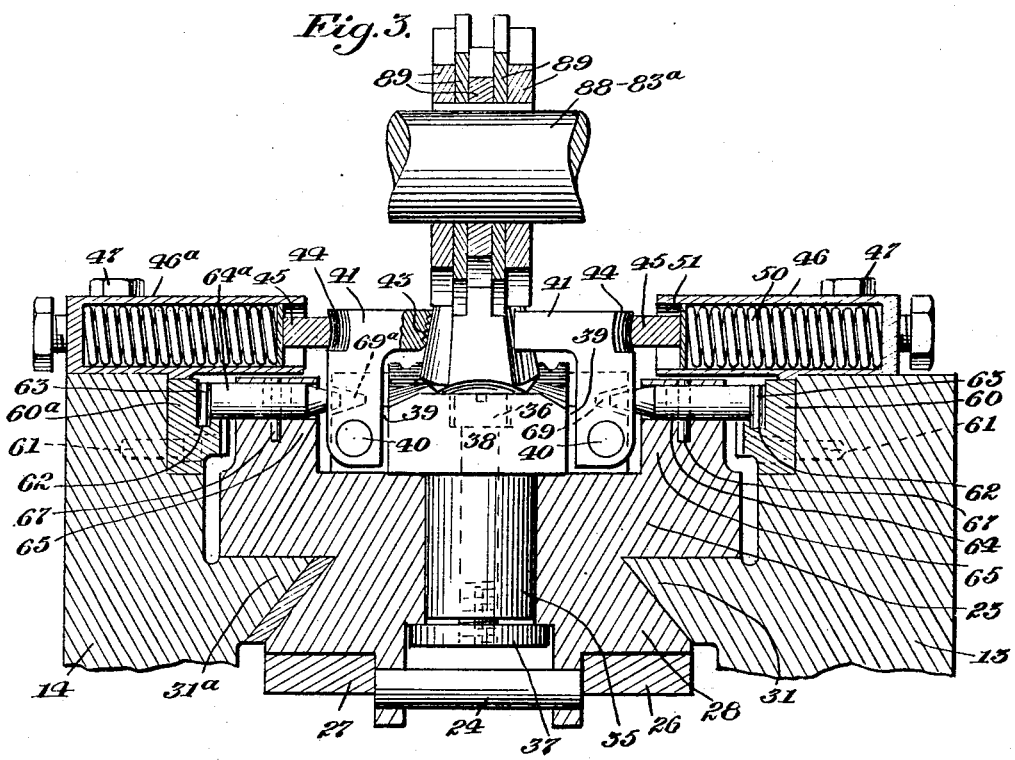
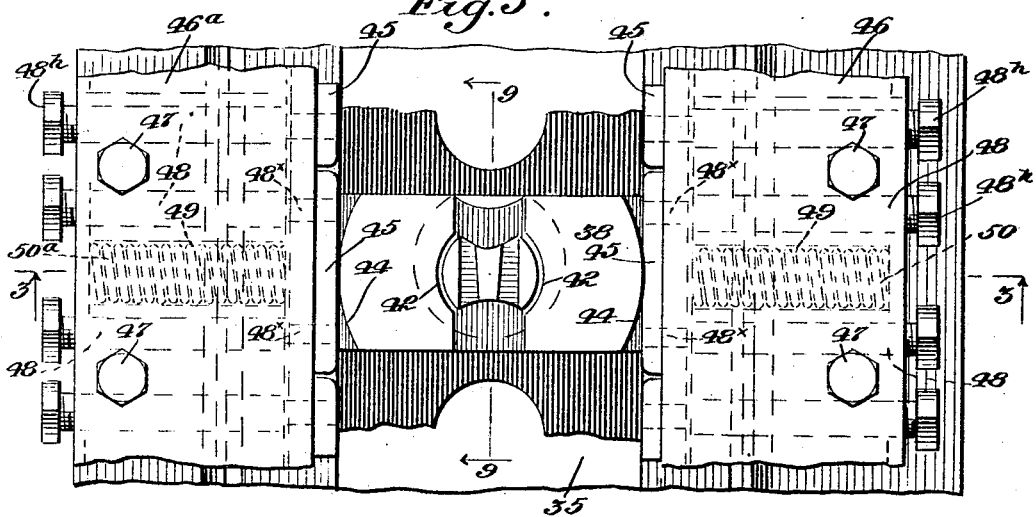

Sept. 15, 1931.　　R. L. DYAS ET AL　　1,823,824
MACHINE TOOL FOR DRESSING ARTICLES ON NONPARALLEL SURFACES
Filed July 13, 1928　　4 Sheets-Sheet 4
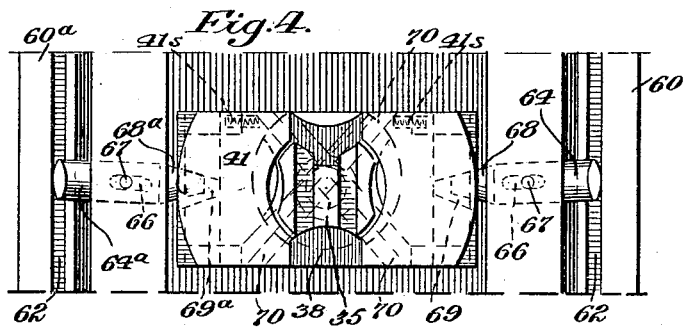
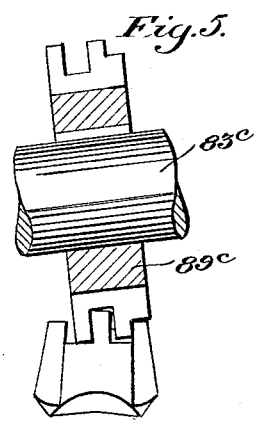
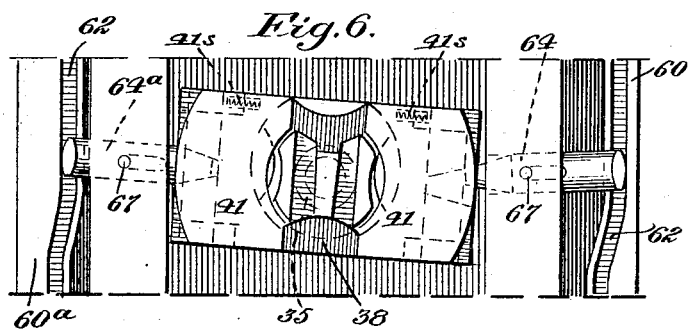
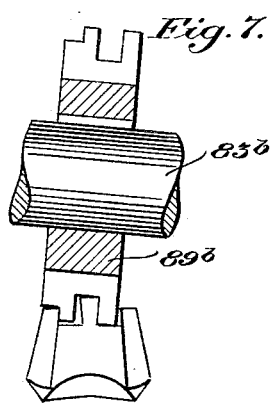
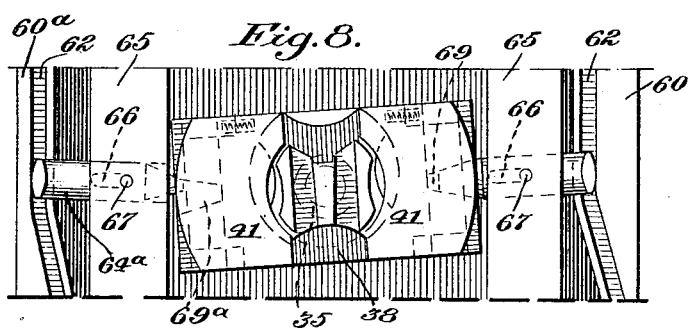
Inventors:
R. L. Dyas and
Joseph Maickel,
By Hurtwait & Mason,
Attys.

Patented Sept. 15, 1931

1,823,824

UNITED STATES PATENT OFFICE

ROBERT L. DYAS AND JOSEPH MAICKEL, OF BUTTE, MONTANA

MACHINE TOOL FOR DRESSING ARTICLES ON NONPARALLEL SURFACES

Application filed July 13, 1928. Serial No. 292,556.

This invention relates to improvements in machine tools for dressing articles on nonparallel surfaces.

In dressing articles which must exactly reproduce one another for purposes of interchangeability, and which are provided with surfaces which are not parallel but must be dressed with exactness and nicety, it has heretofore been necessary to reset the jig or fixture carrying the article for the dressing of the different surfaces, by hand, between the several operations. This could sometimes be accomplished automatically when the surfaces were planes at a diedral angle with intersection line at a right angle to the axis of the dressing machine. When the surfaces, however, were non-parallel so that their line of intersection did not lie in a plane at a right angle to the axis of the dressing tool, it has not been heretofore possible to automatically move and adjust the tool and article with respect to each other for securing the second operation at a predetermined relationship to the first.

According to the present invention, such articles may be readily dressed in a continuous succession, so that all articles will be interchangeable one with another as final products. This result is attained by the employment of a dressing machine having a continuous feeding of the articles to the dressing tools, with means for automatically shifting the angle of presentation of the article to the tools, and with the provision of tools having at their axes of rotation predetermined angles of operation with respect to each other.

On the accompanying drawings:

Figure 1 is a transverse section through such a machine substantially on line 1—1 of Fig. 2.

Fig. 2 is a longitudinal section through such a machine substantially on line 2—2 of Fig. 1.

Fig. 3 is a transverse section on a larger scale of the chucking structure.

Fig. 3a is a plan view corresponding to Fig. 3.

Fig. 4 is a plan view similar to Fig. 3a, but with the chucking members omitted for greater clearness.

Fig. 5 is a transverse section through a second operating arbor showing its inclination and operation upon the article.

Fig. 6 is a view similar to Fig. 4 with the chucking table rocked in one direction.

Fig. 7 is a view corresponding to Fig. 5, but showing the inclination of the third arbor.

Fig. 8 is a view corresponding to Figs. 4 and 6, but with the chucking table rocked in the other direction.

Fig. 9 is a section on line 9—9 of Fig. 3a.

Fig. 10 is a plan view of the chucking table of Fig. 9.

According to this invention, a dressing tool, here represented as of the milling type, is provided with a frame, a pair of freely rotatable sprockets carrying a series of links, each carrying chucking tables for supporting the articles and gripping devices for holding the articles in position, as well as locating and centering pins for determining the angle of presentation of the respective chucking tables beneath the dressing tools. The frame also has a plurality of journal blocks, each of which receives an arbor carrying the milling cutter or cutters for operation upon the article. These blocks carry the arbors at respectively inclined positions, as shown in Figs. 3, 5 and 7, for operating upon the article to produce plane surfaces thereon which relatively have intersections constituting diedral angles whose lines of intersection are horizontal. By the rocking of the chucking table carrying the article, the surfaces may further be located out of plane with one another to form diedral angles whose lines of intersection are vertical. By a combination of the angularity or inclination of the respective arbors, together with the rocking of the chucking tables, it is possible to dress the surfaces to form wedging dove-tails, for example, in the illustrated form.

The invention has been illustrated on the accompanying drawings as a milling machine for forming the wedging dove-tails of drill heads as shown in the respective figures.

In the drawings, a hollow main frame 10 is provided with an intermediate partition wall 11, and the transverse braces 12 to stiffen the walls with respect to one another adjacent their tops. Also upwardly extending from this frame, being in continuation of the outer wall of the partition wall 11, are the guard walls 13 and 14 having the apertured top plate 15. These walls extend only along the central portion of the frame, and guards 16 and 17 are provided to prevent accidents, as will be more clearly described hereinafter.

Freely journaled in the frame are the drum shafts 20, 20a having the drums 21, 21a with spaced flanges 22 thereon to support the article feeding chain. This article feeding chain comprises a plurality of links 23 which are all alike, and in the illustrated form are each provided with three sets of chucking elements. Each link is provided at its lower edge with a pivot pin 24 to receive the tie links 25 which hold the operating links 23 together to form a chain. These links 23 are likewise provided at their bottoms with the oppositely skewed rack teeth 26, 27, which are preferably formed as separate members secured at the bottom of the dove-tailed extensions 28 of the links 23 (Fig. 3).

Likewise journaled in the machine frame is a driving shaft 29 having keyed thereto driving gears 30 which have their teeth skewed to a herring-bone design so that they mesh with and drive the racks 26, 27 of the links 23. As will be seen from Fig. 2, the successive links 23 abut against each other when in the uppermost position or operating flight in engagement by their dove-tails 28 with the mating slide members 31, 31a of the machine frame, so that the pressure from the gears 30 against the teeth of racks 26, 27 will push the upper line of links toward the right in Fig. 2, and beneath the operating arbors.

Each of the individual links 23, as shown in Figs. 2 and 3, is provided with three pivots 35 which are illustrated as vertical in position when beneath the dressing arbors, and are held in position by the cap screws 36 passing downward therethrough, in conjunction with the collars 37 at their lower ends in Fig. 3. As shown in Figs. 3 and 3a, each of these pivots 35 is provided at its upper end with a chucking table 38 which is inclined to the horizontal (Fig. 9). At the sides of the links, the chucking tables 38 are provided with extensions 39 having pivot members 40 to receive the angular gripping jaws 41 which each have an arcuate notch 42 facing each other and provided with teeth 43 to bite against and hold the article to be dressed (Fig. 3). The laterally directed upper surfaces of the respective gripping members are formed as cams 44 to cooperate with the pressure plates 45, as will now be described.

Rigidly fastened opposite each dressing arbor, on the walls 13, 14 of the frame, is a pressure member comprising blocks 46, 46a secured to the respective wall 13, 14 by cap screws 47 and having horizontal holes therethrough for the passage of the guide pins 48 which are secured at their front ends 48x in the pressure plates 45 (Fig. 3a). A further hole 49 is provided in each of the blocks 46, 46a for the reception of the pressure spring 50, 50a, respectively, which thus bears against a thrust plate 51 and against the pressure plate 45 and hence against the cam surfaces 44 of the gripping members 41, so that these members are forced into position upon the article located on the chucking table 38. The bolts 48 are provided with the retaining heads 48h to prevent the projection of the plates 45 from the machine under the impetus of the springs 50, if for any reason the gripping members 41 are not located opposite the same.

The assemblage of pressure plates 45 bolts 48 and springs 50 is repeated along the length of the frame beneath the working arbors, it being preferred to have the axis of a pair of springs 50, 50a lie in the same vertical plane as the axis of each of the dressing arbors.

Likewise located on the upper surfaces of the walls 13, 14 of the frame are the cam blocks 60, 60a, respectively, which are fixed in position by the screws 61. Each of these cam blocks has a groove 62 (Figs. 3, 4, 6 and 8), for the reception of the downwardly extending projection 63 of the locating pins 64, 64a, which are slidably mounted in holes in the upwardly extending lateral flanges 65 of the respective links 23. These holes are respectively located with their axes in the same horizontal plane, and also in vertical planes intersecting at the axis of the pivots 35, a pair of these locating pins 64, 64a being provided opposite each pivot 35. The locating pins 64, 64a are not, however, in the same straight line, but are advanced through a small angular distance in the direction of feed of the respective links 23, for example, and are formed with slots 66 therein to receive the securing pins 67 in the extensions 65 of the respective links 23. Each of the locating pins has a conical end 68, 68a adapted to fit a conical cavity 69, 69a formed in the adjacent side of the chucking table 38 (Fig. 3). These conical cavities 69, 69a are located with a common axial line lying in the same horizontal plane as the axis of the locating pins 64, 64a, and passing through the axis of the respective pivot 35.

The upper surface of the chucking table 38 is preferably provided with the grooves 70 to receive the cutting edges of the drill head according to the present illustration, so that the bite of the teeth 43 of the gripping members 41 will seat the article of work firmly on the chucking table, so that it can neither move nor rotate with respect thereto.

A housing 75 is fixedly secured to the top 76 of the frame 10, 11, which latter is provided with transverse dove-tailed guide rails 77 (Figs. 1 and 2) equal in number to the number of milling arbors to be provided in the illustrated form, here three. Each of these guide rails 77 carries a block 78 which may be adjusted transversely of the machine by a spindle 79 having collars thereon to engage the housing 75 and threaded at its inner end to engage a threaded cavity in the block 78. Each of these blocks 78 is provided with vertical guide rails 80 to receive a respective bearing block 81 which is provided with suitable roller-bearings 82 to carry the arbor 83. This arbor has a reduced rearward extension 84 to receive a worm gear 85 keyed thereto and secured in position by the clamping nut 86 (Fig. 1). At the front end the arbor has a collar 87 and the reduced portion 88 to receive one or more milling cutters 89 (Fig. 3). A stub pin 90 of the arbor extends into a bearing bushing 91 carried in an end cap 92 having slots 93 therein to receive the clamping screws 94 which pass into the upper wall 13. A bracket 95 on the housing 75 is provided above each of the bearing blocks 81 to receive a threaded spindle 96 having an adjusting hand wheel 97 at the upper end thereof and itself threaded into the block 81. Cavities 98 are provided in the block 81 to receive the clamping bolts 99 which extend through the end wall of the housing 75 and through the several blocks 81 and their slides; and when tightened prevent the transverse or vertical movement of the blocks 81 but hold all of these blocks in their pre-adjusted position.

The drive for the mechanism is obtained from an electrical motor M located in the base of the machine and having a driving chain 100 operating a sprocket 101 of the main driving shaft 102 which is journaled in the machine frame and carries keyed thereto a gear 103 meshing with the pinion 104 on the arbor driving shaft 105. The arbor driving shaft 105 has three skew gears 106 thereon, one opposite each of the arbors 83 and engaging with a skew gear 107 on the vertical driving shaft 108 of the arbor, which at its upper end is provided with a worm gear 109 to mesh with the gear 85 on the respective arbor 83. Suitable roller bearings 110 are provided for the vertical shafts 108. The drives for each of the arbors are alike, and need not be shown or described in greater detail.

Likewise journaled in brackets 111 of the frame is the transverse jack-shaft 112 having a skew gear 113 therein driven by a similar skew gear 114 keyed on the main driving shaft 102. A worm 115 on the jack-shaft 112 meshes with and drives a worm gear 116 on the secondary shaft 117, which has a similar worm 118 meshing with a worm wheel 119 on the link driving shaft 29 described above. The link driving shaft 29 is illustrated as having suitable roller bearings 29a.

It is preferred to provide the angle bars 120 in the frame 10 to carry the weight of the links 23 in their passage on the lower flight from the drum 21 to the drum 21a (Fig. 1).

In the present illustration, three arbors 83 are provided, which are respectively designated 83a, 83b and 83c in Fig. 2. The axis of arbor 83a is horizontal so that it operates similarly to an ordinary Lincoln milling machine, and produces the parallel surfaces and grooves as shown in Fig. 3. The second arbor 83b is inclined downwardly toward the right in Fig. 1, as illustrated in Fig. 7, and carries one or more milling cutters 89b which dress certain surfaces of the article on planes which are inclined slightly to the right from a vertical position, as shown in this Fig. 7. The third milling arbor 83c is similarly inclined slightly upward to the right in Fig. 1, as illustrated in Fig. 5, and likewise carries one or more milling cutters 89c to effect a similar dressing of surfaces which are to be slightly inclined toward the left from the vertical, as shown in this Fig. 5.

A yoke 125 is secured by bolts 126 to the upper portion of the walls 13 and 14 above the drum 21, and a shaft 126 is passed across the guard member 17 at this point to support the rock arms 127 carrying a pivot 128 for the marking roll 129 which is held depressed by a plunger 130 actuated by a spring 131 reacting against the yoke 125. The plunger 130 is extended through the yoke 125 and carries the adjusting nut 132, to limit its downward movement, and therewith the downward movement of the marking wheel 129. The marking wheel 129 carries spaced teeth 133 for engagement by the articles passing beneath it, so that the marking wheel 129 is moved by a given angular distance each time an article passes through it and during such movement presents a marking tooth 134 against the upper surface of the article whereby to mark it and indicate that the dressing has been accomplished. The rock arms 127 are provided preferably with a counting device 135 whose operating finger 136 is contacted by a tooth 133 each time the marking wheel 129 is moved, so that the counting device 135 registers the number of articles which have been passed through the mechanism.

The operation of this machine tool is as follows:

The motor M is set in motion, whereby through the several gears and worms are driven the arbors 83a, 83b, 83c of Fig. 2, and the link driving shaft 29 and its gears 30. Preliminary to this, the clamping bolts 94 and 99 will have been loosened and the spindles 79 and 96 revolved until the respective arbors are in such position that their milling cutters 89, 89b, 89c are properly located for accomplishing the dressing intended. The clamping bolts 99 and 94 are then tightened again so that the arbors are locked invariably in such positions.

As a link 23 in its clockwise course around the drums 21, 21a (Fig. 2) comes to the horizontal position and enters into its guided relationship with the dove-tailed flanges 31, 31a of the frame walls 13, 14, it is located just beyond the upper edge of the guard 16. The clamping members 41 are still open, substantially as shown in the lower flight, Fig. 1, and the operator can now insert an unfinished article upon the chucking table 38, where it is self-alined by the inclination of this table as shown in Fig. 9. The article rests on this table during its further movement along the upper horizontal flight. An article is placed upon each of the three tables carried by a link 23. As the gears 30 drive the racks 26, 27, the links 23 are forced forward along their dove-tailed guides and beneath the arbors 83a, 83b, 83c, so that the tools 89, 89b, 89c on the latter operate to dress the surfaces of the articles. As a link 23 comes opposite the first arbor 83a, the gripping plates 45 located opposite the same engage the cam surfaces 44 of the gripping members 41 and force these members inwardly until they bite into and seat the article firmly upon the chucking table 38. This occurs slightly before the article comes beneath the milling tools 89. At the same time, the downward projections 62 of the locating pins 64, 64a enter the grooves 62 of the cam blocks 60, 60a and are held thereby in the position shown in Fig. 4, in which the conical ends 68, 68a of these locating pins project about halfway into the cavities 69, 69a of the chucking table 38. In this position, the chucking table has the axis of its cavities 69, 69a at a right angle to the direction of movement of the link 23, so that a milling operation is accomplished on the article at an angle to the plane a—a of its cutting edges, which is determined by the inclination of the upper surface of the chucking table 38 (Fig. 9).

As the respective link 23 continues to advance toward the right in Fig. 2, and just before a chucking table 38 comes beneath the second arbor 83b, the groove 62 at either side is given an offset to the right, as shown in Fig. 6, whereby the locating pins 64 and 64a are forced toward the right, the pin 64a entering fully by its conical end 68a into the conical cavity 69a, and causing a rotation of the chucking table 38 about its pivot 35 into the position shown in Fig. 6. During this time, the article has been continued in its position on the chucking table 38 by the continued engagement of the gripping members 41 which are forced inward by the action of pressure plates 45, the cam surfaces 44 being for this purpose preferably formed concentrically with the axis of the pivot 35. The second arbor 83b is inclined as shown in Fig. 7, so that by a combination of the rotation of the chucking table 38 about its axis, and the inclination of the arbor 83b itself, certain of the surfaces dressed produce one-half of a wedge-like dove-tail.

Likewise, as the chucking table 38 approaches the third arbor 83c, the cam grooves 62 are offset to the left (Fig. 8) so that the locating pins 64, 64a are now moved toward the left until the conical end 68 of the locating pin 64 enters fully into the conical cavity 69 of the chucking table 38, and this table has been rotated in a counterclockwise direction to the position shown in Fig. 8. The third arbor 83c is likewise inclined upward toward the right, as shown in Fig. 5, so that by a combination of the rotation of the chucking table about its axis and the inclination of the arbor itself, the other surfaces of the wedge-like dovetail are formed on the article.

It will be noted that the operations thus described are repeated successively for the three chucking tables located on each link 23: and for each of the links in turn, since each of the chucking tables has the article secured thereon individually by the pressure plates 45; and each chucking table is rotated and located individually by its individual locating pins 64, 64a; and like operations are performed upon each of the articles by the maintained relative angularities of the arbors 83a, 83b, 83c.

As a respective link 23 comes to the end of the dove-tailed guides 31, 31a, it enters upon the drum wheel 21 and is carried around this wheel and returned on the lower flight. The blocks 46, 46a are preferably continued to a position beneath the shaft 128 of the marking wheel 129, so that the gripping members 41 continue to hold the articles in position on the chucking tables until after they have been marked. As soon as the gripping members 41 leave the pressure plates 45, these members drop or are forced outwardly as by the springs 41s, so that the article is now resting freely on the chucking table 38, from which it may be removed by an operator stationed in front of the guard member 17.

As shown in Fig. 9, the surface of the chucking table 38 is illustrated as a plane a, a, which is inclined to the horizontal by the angle subtended between the plane a, a and the horizontal plane b. The movement of the chucking table is parallel to the horizontal plane b, beneath the cutting tools 89 represented in dotted lines in Fig. 9, so that the article a has its several surfaces m, n, o (Fig. 9) dressed horizontally, but at the same subtended angle with respect to the cutting edges.

It will especially be noted that although the several arbors 83a, 83b and 83c may be moved up and down and axially by means of the adjustment spindles 79 and 96, yet the driving worms 109 and worm wheels 85 remain in mesh throughout such movement so that the driving system of the machine is not interrupted during adjustment.

The several links 23 are held fixedly in position for horizontal movement by the dove-tail guides 31, 31a, while they are beneath the arbors 83a, 83b and 83c which operate upon the articles, and the latter are located upon their chucking tubes, while the power for moving these links 23 is transmitted as the racks 26 and 27 on the bottom of the respective links, this power being transmitted from one link to another by compression so that it is unnecessary to have the connecting links 25 of more than the size sufficient for maintaining the links in chain while they are not being operated upon, including their passage in the return flight.

It is obvious that the invention is not limited to the form of execution illustrated, but that it may be practiced in many ways within the scope of the appended claims.

We claim:

1. In a machine of the class described, a plurality of arbors each having a cutting tool thereon, a chucking table for the article to be dressed, means to cause said chucking table to move past the arbors in a direction substantially at right angles thereto so that the tools may operate upon the articles, said arbors being located at different angles in planes transverse to the direction of movement of said table, a supporting device for said chucking table to permit a rocking movement of the table about an axis substantially at a right angle to the direction of movement of said table and parallel to said planes, and means to hold said chucking table in a definite adjusted position in its passage beneath each arbor.

2. In a machine of the class described, an arbor having a cutting tool thereon, a chucking table and means to guide the same in a rectilinear movement past said arbor, means to support said chucking table including a pivot about which the chucking table may rock, and a fixed cam cooperating with the chucking table to cause it to rock at a point when the cutting tool is not engaged with the article and to hold the chucking table from rocking while the cutting tool is dressing the article.

3. In a machine of the class described, a chucking table and means to cause said table to travel in a rectilinear direction, a plurality of arbors each having a cutting tool thereon, the axes of said arbors being located in parallel planes respectively at a right angle to the said rectilinear direction of movement of the chucking table, the individual arbors being arranged at different angles in their respective planes with respect to said line of travel, individual means to adjust the arbors to and from the chucking table while maintaining their respective angular positions, and to adjust the respective arbors individually in the axial direction, and common locking means to hold all of said arbors in the prevailing adjusted positions.

4. In a machine of the class described, a plurality of traveling links, a pair of wheels, connecting means between said links so that the links can travel around said wheels, means to guide the links for rectilinear movement in an operating flight between said wheels, means independent of said wheels and located adjacent the beginning of the operating flight to operate upon respective links in compression to hold them in position against one another during the operating flight and to cause the links to move around the wheels, chucks mounted upon the respective links to support articles for dressing, and an arbor mounted with its axis substantially parallel to the axes of the wheels and having a cutting tool thereon to dress the articles on the chucks as they pass beneath the arbor.

5. In a machine as set forth in claim 4, the provision of rack segments on each of the links, said independent driving means comprising gear teeth engaging said racks to move the same directly, said links being in abutting relationship one with another so that the driving movement is transmitted in compression from one link to the next.

6. In a machine of the class described, a plurality of links connected in chain, means to guide said links for substantially rectilinear movement in an operating flight, each of said links having a chuck thereon comprising gripping jaws, means to drive the chain of links continuously, pressure plates to cooperate with said chucks guided on the frame of the machine for movement toward and from the respective links, and springs reacting between the pressure plate and the frame to force the plate into engagement with the gripping jaws so that the jaws will automatically effect the resilient clamping of an article in the respective chuck as the chuck is moved past the plate.

7. In a machine as set forth in claim 6, and a plurality of arbors each having a cutting tool thereon to operate upon the article held in the chuck, a pressure plate being located opposite each of said arbors to engage and maintain the gripping jaws in position while the article is being dressed by the said tool.

8. In a machine of the class described, a feeding mechanism for articles to be dressed comprising a plurality of links connected in chain, means to guide said links in rectilinear movement, each of said links having a chucking table and a pivot therefor having its axis at right angles to the said line of movement, the supporting surface of the chucking table being disposed at an angle to the line of movement so that the article is inclined with respect to said line of movement.

9. In a machine of the class described, a feeding mechanism comprising a traveling member, a rockable chuck mounted on said traveling member for movement about an axis at right angles to said line of movement, said chuck having a pair of indexing apertures therein directed radially with respect to such pivot, said apertures being diametrally opposite each other, and a pair of slidable indexing fingers moving in apertures on a fixed part of the traveling member, said fingers sliding radially with respect to said pivot but not in the same diametrical plane therethrough, and means on the machine frame to cause said fingers to make respective sliding movements at predetermined intervals, whereby to cause said chuck to rock about its pivot, and to secure the chuck in such rocked position.

10. In a machine of the class described, a plurality of traveling links connected to form an endless belt, means to guide said links for rectilinear movement in an operating flight, each of said links having a pair of oppositely skewed racks thereon, and driving means for the belt located adjacent the beginning of the operating flight including a shaft having oppositely cut skew gears to mesh with the racks of the respective links whereby to drive the link whose racks are in mesh directly and to drive preceding links by compression from link to link, and a plurality of arbors having cutting tools thereon to operate upon articles supported on said links, said arbors being located opposite the links in compression so that the cutting tools will operate only upon articles supported on links in compression.

11. In a machine of the class described, a frame having rectilinear guide means thereon, a traveling member movable along said guide means, a chuck adapted to rock about a pivot at right angles to the direction of movement of the traveling member, means on the frame to rock said chuck through predetermined angles at predetermined times and to hold said chuck against movement except at the time of such rocking, and means to move said traveling member.

12. Machine as in claim 11, in which the chuck has a work supporting surface inclined with respect to the direction of movement, and a plurality of arbors each having a cutting tool thereon and each located in a respective plane at a right angle to the direction of movement of said traveling member, the angles of the respective arbors being different with respect to such line of movement, said frame means for rocking the chuck being so constructed and arranged as to rock the chuck in one direction after it has left the first arbor and in the other direction after it has left the second arbor, so that the respective arbors will operate upon an article supported by the chuck upon different non-parallel planes.

In testimony whereof, we affix our signatures.

ROBERT L. DYAS.
JOSEPH MAICKEL.